UNITED STATES PATENT OFFICE 2,611,782

PREPARATION OF TERTIARY-ALKYL ISOCYANATES

Newman M. Bortnick, Philadelphia, Pa., assignor to Rohm & Haas Company, Philadelphia, Pa., a corporation of Delaware No Drawing. Application June 30, 1950,
Serial No. 171,540

6 Claims. (Cl. 260—453)

This invention relates to a process for preparing tertiary-alkyl isocyanates. The particular isocyanates which are made by the process of this invention all contain the molecular configuration

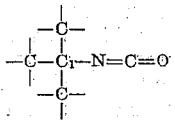

wherein $C_1$ is a tertiary carbon atom connected to three other carbon atoms. The compounds may also be represented by the following general formula

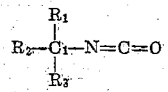

in which $R_1$, $R_2$, and $R_3$ are all alkyl groups such as the following groups: Methyl, ethyl, isopropyl, n-butyl, isobutyl, tert.-butyl, sec.-amyl, 2-ethylhexyl, lauryl, and hexadecyl groups, and all isomers of these groups. The invention also relates to the preparation of those isocyanates of the above formula wherein $R_1$ and $R_2$ taken together with the tertiary carbon atom, $C_1$, represent an aliphatic cyclic radical, to one and the same carbon atom of which are attached both the isocyanate group, —NCO, and the alkyl group, $R_3$. That is to say, $R_1$ and $R_2$, in addition to representing individual alkyl groups, when taken together also represent an alkylene group, preferably a polymethylene group, the terminal carbon atoms of which alkylene group are both attached to the tertiary carbon atom, $C_1$, which also carries the alkyl group, $R_3$, and is attached to the isocyanate group, —NCO. Examples of such isocyanates are the following:

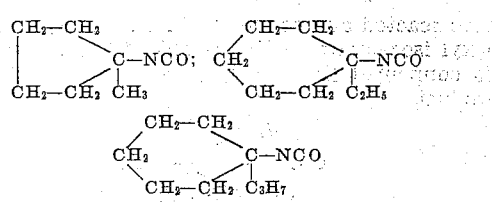

The smallest radical represented by the characters $R_1$, $R_2$, and $R_3$ above is, of course, the methyl group and the largest is the hexadecyl group, since this process is limited to those isocyanates which can be made on a practical commercial scale and in which, therefore, the total number of carbon atoms in the three R-groups is from three, as in the case of tertiary-butyl isocyanate, to eighteen as in the case, for example, of ethyldioctylcarbinyl isocyanate,

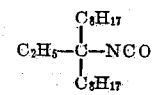

According to the process of this invention, the tertiary-alkyl isocyanates are made by reacting urea with tertiary-alkyl amines having the general formula

in which the characters $R_1$, $R_2$, $R_3$, and $C_1$ have the same significance as is described above in connection with the general formula for the isocyanates. The formation of the isocyanates is accompanied by the evolution of ammonia and the reaction is known to take the following course:

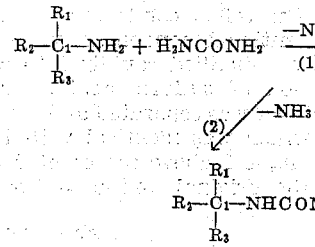

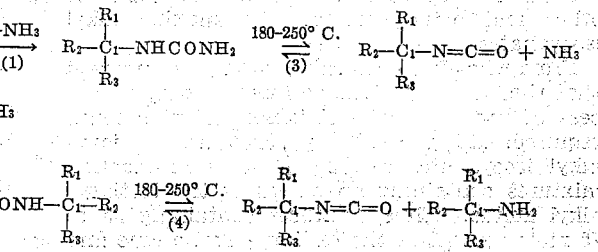

The reaction of the tertiary-alkyl amine with urea to liberate ammonia and to form the intermediate mono- and di-substituted ureas (reactions 1 and 2) proceeds readily at temperatures from 90° C. to 150° C. and preferably from 100° C. to 140° C. The reaction is quite rapid at 100° C. and is very rapid at 140° C. After the liberation of ammonia is substantially complete, the temperature is raised to a point within the range of 180° C. to 250° C. where the mono- and di-substituted ureas decompose respectively to the isocyanate and ammonia and to the isocyanate and the original amine. Since the isocyanates can react with ammonia or tertiary-alkyl amines to form mono- and di-substituted ureas, an equilibrium occurs at the elevated temperatures, as shown above in reactions 3 and 4, and it is, therefore, necessary to quench or condense or otherwise "freeze" the reaction products in order to obtain substantial yields of the isocyanates. That tertiary-alkyl isocyanates can thus be obtained is surprising in view of the fact that non-tertiary-alkyl isocyanates cannot be formed from the corresponding non-tertiary-alkyl amines by the same process. By the preferred procedure the hot vapors of the reaction mixture are led directly into a quenching bath of cold aqueous acid. Ice-cold (0° to —10° C.) aqueous solutions of the mineral acids are recommended although solutions as warm as 50° C. can be used. This quenching step prevents the hot isocyanate and amine or ammonia from reacting, with a resultant shift of the equilibrium to the left, and at the same time converts the unreacted amine or ammonia to water-soluble salts while the isocyanate separates as an organic liquid layer which can be easily removed and thereafter purified.

When, however, an excess of urea is employed, the amount of the di-substituted urea intermediate which is formed is negligible and the reaction follows the course (1)–(3) shown above rather than the course (2)–(4) above. In this case, since ammonia can be driven off, there is not the same need for quenching the reaction mixture as when a lesser amount of urea is used. Even in this case though, the condensation of the vapors of the reaction mixture and passage of the resultant condensate into an aqueous acid solution provide a convenient and desirable way of isolating the isocyanate.

The tertiary-alkyl group of the amine remains intact during the reaction of the amine with urea and as a result the same group appears in the isocyanate. Accordingly, the process which is described above and in the following examples can be employed for the manufacture of all of the tertiary-alkyl isocyanates falling within the above description even though the following illustrative examples be limited to the preparation of a few specific tertiary-alkyl isocyanates. One big advantage of this process is that it employs urea as the source of the isocyanate group and, because urea is so very cheap and readily available, this process is decidedly inexpensive as compared to other and older processes for making alkyl isocyanates.

From what has been said above, it is apparent that there is an advantage in employing an excess of urea over the stoichiometrical amount required. It is a fact, though, that these tertiary-alkyl isocyanates can be made from reaction mixtures containing an excess of the tertiary-alkyl amine. Thus, mixtures containing 25 to 75 mole percent of the tertiary-alkyl amine and 75 to 25 mole percent of urea are operable.

This process operates well at ordinary atmospheric pressure with most tertiary-alkyl amines. When, however, a low-boiling amine, such as tertiary-butylamine, is used, it becomes necessary to employ pressure so that the temperatures of reaction noted above can be reached.

*Example 1*

A mixture of one mole of urea (60 grams) and 2.5 moles (328 grams) of neopentyldimethylcarbinylamine having the formula

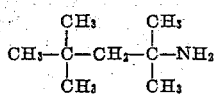

was placed in a three-necked flask equipped with a mechanical stirrer, thermometer, and reflux condenser. Stirring was begun and the heterogeneous mixture was slowly heated to 129° C. at which point ammonia was liberated. As ammonia continued to evolve, the mixture was heated slowly to 185° C. over a period of 4.5 hours. A total of 34.5 grams of ammonia was liberated. A small sample of the reaction product was removed and was crystallized twice from isooctane. Its melting-point was 152° C. and its analysis confirmed the structure

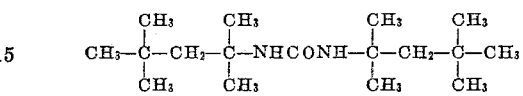

The reflux condenser was replaced with a bent glass tube which extended from the neck of the reaction flask to just below the surface of a 33% aqueous solution of sulfuric acid contained in a flask immersed in an ice-bath. Heating was resumed and 95% of the contents of the flask was rapidly vaporized and passed in the vapor state directly into the ice-cold acid solution. The pot-temperature during the vaporization was 205°–215° C. Despite the presence of the ice-bath, the temperature of the acid solution rose to 40° C. A large amount of precipitate which formed in the solution was filtered off and identified as the unchanged di-substituted urea. The filtered solution separated into two layers and the organic layer was removed and distilled under reduced pressure to give a product boiling at 64°–66° C./30 mm. of pressure (Hg) and at 170°–172° C./760 mm. This product represented a 35% conversion of the original tertiary-alkyl amine and the analysis showed the compound to be neopentyldimethylcarbinyl isocyanate,

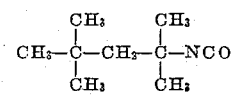

*Example 2*

A mixture of one mole of urea and one mole of neopentyldimethylcarbinylamine was stirred and heated to refluxing temperature over a period of two hours and was then refluxed for one hour. The reflux condenser was replaced with a conventional condenser and the reaction mixture was distilled rapidly into a 33% aqueous solution of sulfuric acid after which the organic layer was separated and redistilled. The product which was identical with that obtained in Example 1 above represented a 39% conversion of the original amine to isocyanate.

*Example 3*

By the procedure of Example 1 urea and 1-methylcyclohexylamine-1,

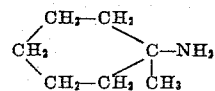

were reacted and converted into 1-methyl-cyclohexyl isocyanate to the extent of 32%. Analysis confirmed the following composition of the product

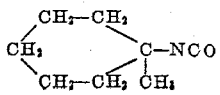

Example 4

The general procedure of Example 1 was followed in the conversion of isooctyldiethylcarbinylamine to isooctyldiethylcarbinyl isocyanate,

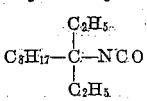

by reacting the former with an equimolar amount of urea. The one departure from the procedure of Example 1 was that during the distillation of the reaction mixture into the cold acid solution a reduced pressure of 25 mm. was employed as is often customary. The pot-temperature was 180°–250° C. Thirty-six percent of the amine and urea was converted to the isocyanate which boiled over the range 90°–115° C. at 2 mm. pressure.

Of interest at this point is the fact that, when urea was reacted with nonylamine (a primary-alkyl amine) and 2-amino-octane (a secondary-alkyl amine) respectively by the procedure set forth in Example 2, there was no evidence whatever of the formation of the corresponding isocyanates even though the temperature was carried to 300° C. in the final stage. The intermediate substituted ureas were isolated but these were so stable that they failed to convert to the isocyanates under the influence of heat.

Example 5

Into an autoclave, equipped with a reflux condenser were charged one mole of urea and two moles of tert.-butylamine. Heat was applied and, after the temperature reached 90° C., the autoclave was vented through the reflux condenser at five-minute intervals in order to allow ammonia to escape. The temperature was raised to 130° C. at which point it was held for one hour. The autoclave was periodically vented and after the heating at 130° C. the evolution of ammonia had practically ceased. The contents of the autoclave were cooled to room temperature and were transferred to a distillation flask from which the material was vaporized as rapidly as possible directly into a solution of sulfuric acid as described in Example 1. The conversion to tert.-butyl isocyanate was 41% based on the urea and the compound was identified by analysis.

The tertiary alkyl isocyanates which are prepared by the process of this invention react with organic compounds, such as proteinaceous materials, which contain amino groups and with compounds, such as carbohydrates, which contain hydroxyl groups. Consequently, they are useful in the treatment of leather and wool and in the modification of starch.

I claim:

1. A process for the preparation of tertiary-alkyl isocyanates having the formula

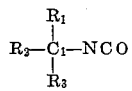

in which $R_1$, $R_2$ and $R_3$ represent alkyl groups and in addition $R_1$ and $R_2$ taken together with the tertiary carbon atom, $C_1$, represent a cycloaliphatic radical which carries the alkyl substituent, $R_3$, on the same carbon atom which is joined to the isocyanate group, —NCO, the number of carbon atoms in the groups represented by $R_1$, $R_2$, and $R_3$ totalling three to eighteen, which process comprises heating a mixture containing 75 to 25 mole percent of urea and 25 to 75 mole percent of a tertiary-alkyl amine of the formula

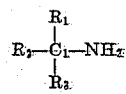

in which the characters $R_1$, $R_2$, $R_3$, and $C_1$ are identical with the same characters described above, at a temperature from 100° C. to 150° C. until the liberation of ammonia has substantially ceased, then heating the resultant product to a temperature from 180° C. to 250° C. separating the resultant decomposition products and thereafter isolating the tertiary-alkyl isocyanate.

2. A process for the preparation of tertiary-alkyl isocycanates having the formula

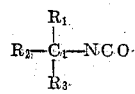

in which $R_1$, $R_2$, and $R_3$ represent alkyl groups of which the total number of carbon atoms is three to eighteen, which process comprises heating a mixture containing 75 to 25 mole percent of urea and 25 to 75 mole percent of a tertiary-alkyl amine of the formula

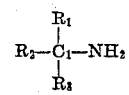

in which the characters $R_1$, $R_2$, and $R_3$ are identical with the same characters described above, at a temeprature from 100° C. to 150° C. until the liberation of ammonia has substantially ceased and thereafter heating the resultant mixture to a temperature from 180° C. to 250° C. and distilling said mixture into an aqueous solution of a mineral acid and thereafter removing the tertiary-alkyl isocyanate which separates from said aqueous solution.

3. A process for the preparation of neopentyldimethylcarbinyl isocyanate having the formula

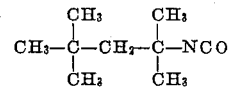

which comprises heating a mixture containing 75 to 25 mole percent of urea and 25 to 75 mole percent of neopentyldimethylcarbinylamine at a temperature from 100° C. to 150° C. until the liberation of ammonia has substantially ceased and thereafter heating the resultant mixture to a temperature from 180° C. to 250° C. and distilling said mixture into an aqueous solution of a mineral acid and thereafter removing the neopentyldimethylcarbinyl isocyanate which separates from said aqueous solution.

4. A process for the preparation of 1-methylcyclohexyl isocyanate having the formula

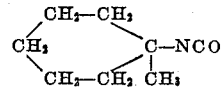

which comprises heating a mixture 75 to 25 mole percent of urea and 25 to 75 mole percent of 1-methyl-cyclohexylamine at a temperature from 100° C. to 150° C. until the liberation of ammonia has substantially ceased and thereafter heating the resultant mixture to a temperature from 180° C. to 250° C. and distilling said mixture into an aqueous solution of a mineral acid and thereafter removing the 1-methyl-cyclohexyl isocyanate which separates from said aqueous solution.

5. A process for the preparation of isooctyldiethylcarbinyl isocyanate having the formula

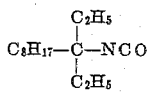

which comprises heating a mixture containing 75 to 25 mole percent of urea and 25 to 75 mole percent of isooctyldiethylcarbinylamine at a temperature from 100° C. to 150° C. until the liberation of ammonia has substantially ceased and thereafter heating the resultant mixture to a temperature from 180° C. to 250° C. and distilling said mixture into an aqueous solution of a mineral acid and thereafter removing the isooctyldiethylcarbinyl isocyanate which separates from said aqueous solution.

6. A process for the preparation of tertiary-butyl isocyanate which comprises heating a mixture containing 75 to 25 mole percent of urea and 25 to 75 mole percent of tertiary-butylamine under pressure at a temperature from 100° C. to 150° C. until the liberation of ammonia has substantially ceased and thereafter heating the resultant mixture to a temperature from 180° C. to 250° C. and distilling said mixture into an aqueous solution of a mineral acid and thereafter removing the tertiary-butyl isocyanate which separates from said aqueous solution.

NEWMAN M. BORTNICK.

REFERENCES CITED

The following references are of record in the file of this patent:

UNITED STATES PATENTS

| Number | Name | Date |
| --- | --- | --- |
| 2,409,712 | Schweitzer | Oct. 22, 1946 |

OTHER REFERENCES

Knoll A. G., Belgian Patents 450,540 and 450,541 as abstracted in Chem. Abstr., vol. 42, column 214 (1948).

Brander, Rec. trav. chim., vol. 37, pp. 67–87 (1917), as abstracted in Chem. Abstr., vol. 12, pp. 1467–1468 (1918).